Jan. 3, 1950     C. C. CHRONIC ET AL     2,493,718
LEVER ENGINE ACTION
Filed Sept. 14, 1944     2 Sheets-Sheet 2

UNITED STATES PATENT OFFICE 2,493,718

LEVER ENGINE ACTION

Clarence C. Chronic, Freeport, Ill., and Clifford A. Shaffer, Pasadena, Calif., assignors to Lever Motors Corporation, Wheaton, Ill., a corporation of Delaware Application September 14, 1944, Serial No. 554,048

5 Claims. (Cl. 74—40)

This invention relates in general to an internal combustion engine of the Diesel type in which the crank shaft and piston are connected by a lever mechanism.

An important object of the invention is to design and proportion the throw of the lever in such a manner that the piston rod is located at all times on the same side of the center line joining it to the connecting lever, thereby reducing the side thrust of the pistons on the cylinder wall and reducing piston slap.

A further object of the invention is to improve the construction and method of producing the connecting lever itself so that it is usually applied, assembled, removed and adjusted.

A still further object of the invention is to improve the construction of the lever and its connections with the crank shaft and the piston by providing a single bearing attachment pin at each side of the lever which is accessible from one side of the motor opposite a removable plate.

A still further object of the invention is to provide a removable side plate through which the piston and piston rod can be removed, adjusted and replaced in the upper crank case without removing either the lower crank case, the piston, or the piston head.

A still further object of the invention is to improve the design and construction of a Diesel engine of this type so that piston acceleration can be controlled, promoting better turbulence which in turn will produce better combustion, lower fuel consumption and high power output.

Other objects of the invention will appear in the specification and will be apparent from the accompanying drawings in which, Fig. 1 is a vertical section of an engine constructed in accordance with this invention;

Figure 1:
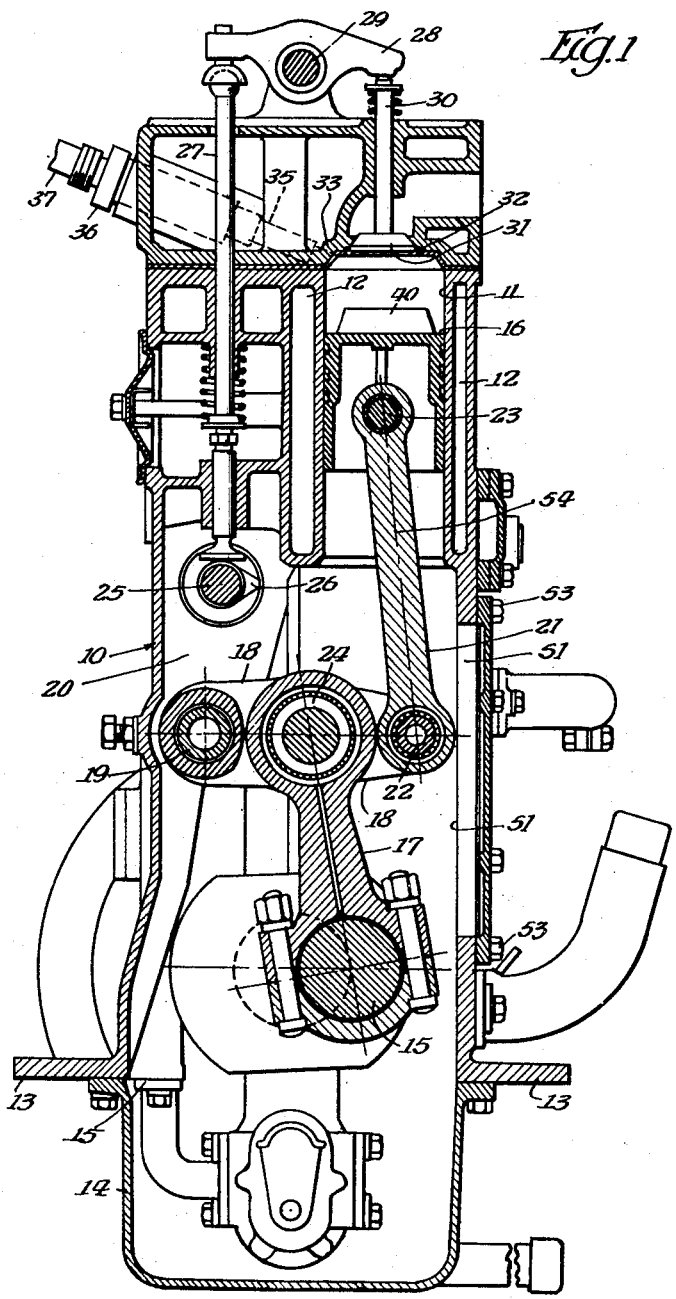

The usual connection of the piston connecting rod is such that the throw is from one side to the other of its center line of movement as the piston is reciprocated in the cylinder. If connected directly to a crank shaft, the throw of the piston rod is at a wide angle resulting in excessive wear of the piston itself, thereby increasing the side thrust of the piston and usually producing an objectionable piston slap. Even in previous types of lever engines, the piston rod throw has been from one side to the other of the piston center line. The present invention overcomes these objections by locating the operating lever so that the connection of the piston rod thereto is always at the same side of the center line of the piston, thereby resulting in a very small variation of the thrust angle, maintaining the angle of thrust at all times on the same side of the center line of movement of the piston and very close to the actual center line of motion of the piston.

This construction has the advantage that a narrow upright type of engine structure can be adopted, the extremity of the operating lever is close to one side wall of the engine, and by locating a removable plate at this side of the engine, the lever and all adjustments thereon are freely accessible by simply removing the side plate in the upper portion of the crank case.

Referring now more particularly to the drawings, a Diesel engine of the lever operated type is shown having an upper crank case portion 10 with cylinders 11 (only one shown) at the top surrounded by a water jacket 12 and supporting flanges 13 at the bottom to which a lower crank case 14 is bolted.

A crank shaft 15 is suitably mounted in the crank case and for each piston 16, there is a connecting rod 17 connected at one end to the crank shaft 15 and at the other end to an operating lever 18 intermediate the ends thereof. One end of the lever is mounted by means of a hollow bearing 19 in supporting ribs 20 at one side of the crank casing and to the other end of the operating lever, one end of a piston rod 21 is connected to a bearing sleeve 22, the other end being connected to a wrist pin 23 extending transversely in the piston 16. The upper end of the connecting rod is preferably mounted upon a bearing sleeve 24 so that the three bearings for the operating lever are large in size to give a large bearing surface; they are hollow for lightness and strength, and they tend to dissipate heat quickly thereby requiring a minimum amount of oil which does not rapidly deteriorate.

Figure 2:
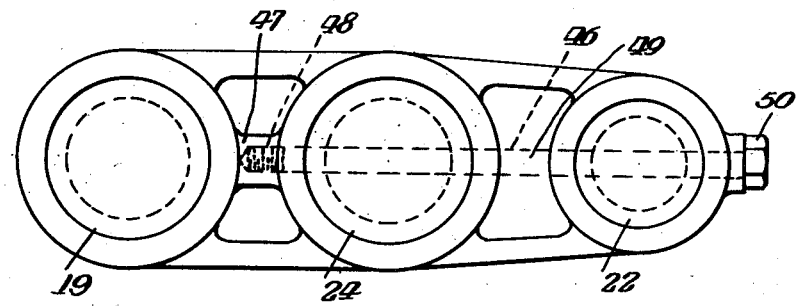
Fig. 2 is a side elevation of an improved form of lever structure.
Figure 3:
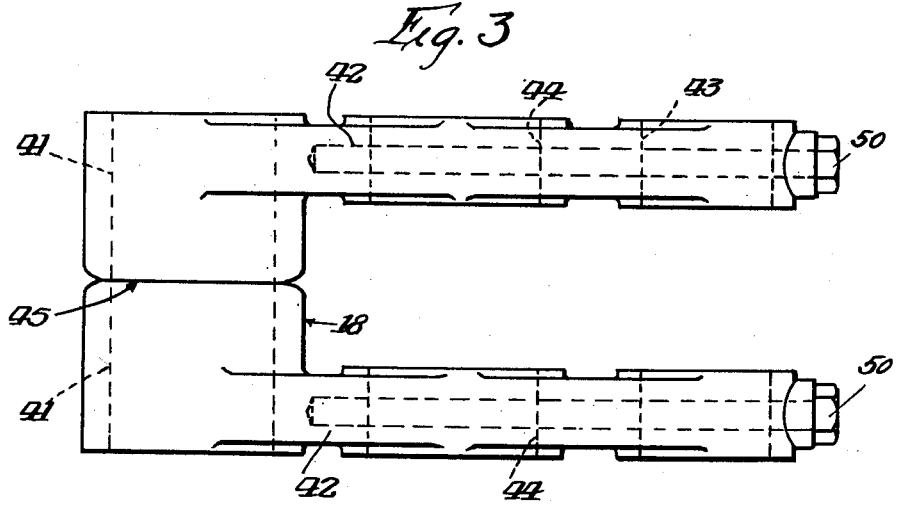
Fig. 3 is a plan view illustrating a lever formed of two pieces separately made and connected together before machining to produce a light and strong operating structure.

As shown more clearly in Figs. 2 and 3, the operating lever 18 comprises two similar parts each having an end bearing portion 41 for receiving the hollow bearing 19 and extending at one side thereof, a portion 42 of reduced width having an outer bearing portion 43 for receiving the bearing sleeve 22 and an intermediate bearing portion 44 for receiving the connecting rod bearing sleeve 24.

In practice, two rough or partially finished pieces of this shape and form are turned oppositely as shown in Fig. 3 and welded or otherwise secured together upon their contact line 45 producing a rectangular U-shape structure which is mounted upon the bearing sleeve 19 in one side of the motor frame.

Extending inwardly from the outer end of each of the portions of reduced width 42 and extending centrally thereof is a bore 46 which terminates in a rib 47 between the bearing portions 41 and 44 where the extremity 48 of the bore is threaded. A long bolt 49 having an outer head 50 is insertable through each bore 46 and through corresponding openings at the ends of the bearing sleeves 22 and 24 so that these sleeves are easily set and secured in place by the same fastening bolt, inserted from the outer end of each side of the lever. The ends of the connecting rod 17 and the piston rod 21 which are connected to the lever 18 are disposed between the two sides 42 mounted upon the bearing sleeves secured therein. Roller or other bearings may be interposed between the ends of the connecting rod and piston rod and the sleeve bearing portions, if desired, but this forms no particular part of the present invention.

By proportioning the length of the lever 18 so that when mounted upon the bearing sleeve 19, the outer end of the lever or the bolt head 50 is close to the adjacent wall of the engine, an opening 51 may be provided in this side of the engine wall which extends from a point above the mounting of the lever 18 to a point adjacent the crank shaft center which is closed by a single plate 52 attachable on the outside by studs 53 or in any other well known manner.

With this construction, the throw of the lever from the highest position of the piston to the lowest position thereof as indicated in Fig. 1 will still maintain the center line of the piston rod on the same side of the center line 54 of the travel of the piston 16, and in this movement, the throw of the piston has a very small angular variation so that the thrust is always approximately along the center line of the piston and never is at a greater variation therefrom than a few degrees more or less depending upon the position of the piston, the greatest angular deviation being approximately midway of the stroke of the piston and the thrust being straightest at both ends of travel of the piston where the tendency for side thrust and piston slap is the greatest. It is for this reason that there is less wear and less tendency to side thrust in this type of action than in other types of lever operated engines and in the conventional piston rod and crank shaft type.

While other conventional features of an internal combustion engine such as the water pump, oil pump, breather and the like, are shown, they form no particular part of the invention in this case.

The invention is not to be understood as restricted to the details set forth since these may be modified within the scope of the appended claims without departing from the spirit and scope of the invention.

We claim:

1. In a lever operated internal combustion engine, a crank shaft and a connecting rod extending therefrom, a piston and a piston rod extending therefrom, an operating lever having one end pivoted at the side of the engine connected intermediate its ends to the connecting rod and connected at its other end to the piston rod, the operating lever comprising two spaced extremities with bearing openings therethrough and the bearing connection for the connecting rod and piston rod each comprising a sleeve extending through the connecting rod and piston rod and also extending through the corresponding spaced bearing openings of the lever.

2. In a lever operated internal combustion engine, comprising a piston and a piston rod extending therefrom, a crank shaft and a connecting rod extending therefrom, an operating lever pivoted at one end in the engine and having separate bearing connections intermediate the ends and at the free end with the connecting rod and piston rod respectively, the bearing connections for the connecting rod and piston rod comprising sleeves extending through bearing openings in the lever, and a single fastening rod extending from the outer end of the lever and through openings in the ends of the sleeves for holding both sleeves in place with respect to the lever.

3. In a lever operated internal combustion engine, comprising a piston and a piston rod extending therefrom, a crank shaft and a connecting rod extending therefrom, an intermediate operating lever having one end pivoted at one side of the engine and the free end extending to the opposite side of the engine, bearing connections on the lever with the free ends of the connecting rod and piston rod comprising bearing members mounted in the lever, a common fastening for the ends of the bearing members at one side of the lever, comprising a fastening extending bolt inwardly through a bore in the lever with its fastening nut at the outer end of the lever, the adjacent wall of the engine being apertured and having a removable plate closing the aperture adjacent the end of the lever and said fastening bolt.

4. In a lever operated engine, comprising a piston and a piston rod, a connecting rod and a crank pin, an operating lever mounted at one end in the side of the engine and having bearing connections at the other end and intermediate the ends with the piston rod and connecting rod, the said lever comprising two similar pieces turned oppositely and placed together, each piece having a hollow sleeve with a narrow extension at one end thereof, having bearing openings therein, the narrow extensions being disposed outermost and spaced apart when the two similar pieces are put together, and bearing sleeves extending between the narrow extensions and supported thereby with the piston rod and connecting rod connections mounted on the bearing sleeves between the narrow extensions.

5. In a lever operated engine, comprising a piston and a piston rod, a crank shaft and a connecting rod, an operating lever pivoted at one end in the engine and having bearing connections at the other end and intermediate the ends with the piston rod and the connecting rod, said lever comprising two similar pieces turned oppositely and placed together, each piece having a bearing sleeve with a narrow extension at one end in which are openings parallel to the said sleeve openings, the sleeve portions being secured together with the narrow extensions at the outside for receiving a common bearing through the sleeve openings, bearing members mounted in the bearing openings of the said narrow extensions at the other end and intermediate the ends for receiving the connecting rod and piston rods thereon, and fastening bolts extending from the outer end of each narrow extension through bores therein and through the ends of the said bearing members mounted in the narrow extensions for holding them in place.

CLARENCE C. CHRONIC.
CLIFFORD A. SHAFFER.

REFERENCES CITED

The following references are of record in the file of this patent:

UNITED STATES PATENTS

| Number | Name | Date |
|---|---|---|
| 242,401 | Wacker | May 31, 1881 |
| 247,741 | Benier | Oct. 4, 1881 |
| 610,488 | Hugus | Sept. 6, 1898 |
| 1,092,915 | Keller | Apr. 14, 1914 |
| 1,350,178 | Pribil | Aug. 17, 1920 |
| 1,384,343 | Powell | July 12, 1921 |
| 1,567,172 | Powell | Dec. 29, 1925 |
| 1,673,280 | Evans | June 12, 1928 |
| 1,810,214 | Johnson | June 16, 1931 |
| 1,874,194 | King | Aug. 30, 1932 |
| 1,978,058 | Peterson | Oct. 23, 1934 |